US010123271B2

(12) United States Patent
Wu (10) Patent No.: US 10,123,271 B2
(45) Date of Patent: Nov. 6, 2018

(54) CONTROL CHANNEL MONITORING METHOD AND ACCESS TERMINAL (71) Applicant: Huawei Technologies Co., Ltd., Shenzhen (CN)

(72) Inventor: Xiang Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/465,386

(22) Filed: Mar. 21, 2017

(65) Prior Publication Data

US 2017/0280390 A1 Sep. 28, 2017

(30) Foreign Application Priority Data

Mar. 22, 2016 (CN) .......................... 2016 1 0164261

(51) Int. Cl.
*H04B 1/38* (2015.01)
*H04W 52/02* (2009.01)

(52) U.S. Cl.
CPC ... *H04W 52/0229* (2013.01); *H04W 52/0216* (2013.01); *H04W 52/0248* (2013.01); *Y02D 70/00* (2018.01)

(58) Field of Classification Search
CPC ......... H04W 72/0446; H04W 74/0833; H04W 48/16; H04W 76/048; H04W 88/02; H04W 88/08; H04W 28/0221; H04W 56/001; H04W 48/04; H04W 52/0245
USPC ....................................... 455/502, 574, 528
See application file for complete search history.

(56) References Cited

U.S. PATENT DOCUMENTS

| 2003/0016702 A1 | 1/2003 | Bender et al. |
| 2013/0242772 A1* | 9/2013 | Attar ..................... H04B 7/0871 370/252 |

FOREIGN PATENT DOCUMENTS

| CN | 1511424 A | 7/2004 |
| CN | 1826009 A | 8/2006 |
| CN | 1832619 A | 9/2006 |
| CN | 101145829 A | 3/2008 |
| CN | 101146347 A | 3/2008 |

* cited by examiner

Primary Examiner — Tu X Nguyen
(74) Attorney, Agent, or Firm — Leydig, Voit & Mayer, Ltd.

(57) ABSTRACT

A control channel monitoring method and an access terminal are disclosed. The method includes: detecting, by an access terminal if the access terminal is in an initialization state currently, whether the access terminal satisfies a first preset condition; detecting, by the access terminal if the access terminal is in a monitoring state currently, whether the access terminal satisfies a second preset condition; and monitoring, by the access terminal, only a particular timeslot on a control channel if the access terminal satisfies the first preset condition in the initialization state or the access terminal satisfies the second preset condition in the monitoring state, where the particular timeslot is a timeslot that is used by the access network for sending a synchronous capsule or a sub-synchronous capsule. According to the present invention, power consumption of an access terminal can be reduced.

10 Claims, 4 Drawing Sheets

CONTROL CHANNEL MONITORING METHOD AND ACCESS TERMINAL

CROSS-REFERENCE TO RELATED APPLICATIONS

This application claims priority to Chinese Patent Application No. 201610164261.6, filed on Mar. 22, 2016, which is hereby incorporated by reference in its entirety.

TECHNICAL FIELD

The present invention relates to the field of wireless communications technologies, and in particular, to a control channel monitoring method and an access terminal.

BACKGROUND

In a CDMA2000 1× EV-DO network, a radio link between an access terminal (AT) and an access network (AN) mainly has the following several states: an initialization state, an idle state, and a connected state. The initialization state means a process in which the AT finds a network after startup and is synchronized to the network. The connected state means that an open connection exists between the AT and the AN, and forward and backward data packet transmission and receiving may be performed. The idle state means a state after the AT is synchronized to the network and before a connection is established. In the idle state, the AN sends a paging message for the AT, and AT monitors a control channel message, paging, and the like, to prepare for service connection establishment that may be initiated at any time. A synchronous capsule (SC), a sub-synchronous capsule (SSC), a synchronous sleep state capsule, and an asynchronous capsule may be transferred on a control channel, and the synchronous sleep state capsule may be carried in the SC or the SSC for transfer.

The AT in the idle state generally has the following several sub-states:

1. A non-activated state: When the AT has captured a service network but a connection is not opened, the AT is in a non-activated state. In this state, the AT waits for an ACTIVE command, and the AT continuously monitors the control channel.

2. A monitoring state: When there is no data transmission in the connected state, the AT sends a disconnection message to the AN, and then the AT enters a monitoring state. In this state, the AT continuously monitors the control channel, and monitors a paging channel, and when necessary, updates a parameter received on the control channel, and the AN may send paging for the AT, and the AT monitors the paging and responds to the paging.

3. A sleep state: When receiving a synchronous sleep state capsule, the AT enters a sleep state. The AT closes some processing resources to reduce power consumption and lengthen a battery life. In this state, the AT does not monitor the control channel, and does not allow the AN to send a unicast packet to the AT.

4. A connection establishment state: When the AT in the idle state has data to send, the AT and the AN establish a connection. In this state, the AT continuously monitors the control channel.

Figure 1:
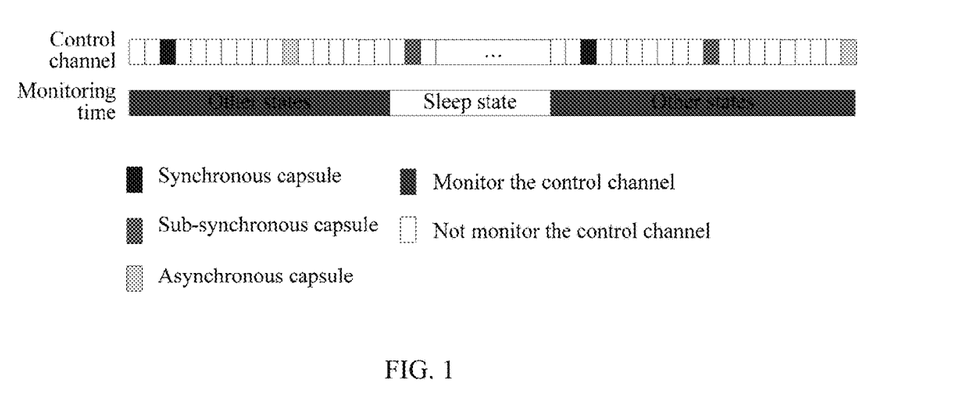
FIG. 1 is a sequence chart showing that an access terminal monitors a control channel in a conventional technology.

It can be known from above that, when being in other states than the sleep state, the AT needs to enable a radio frequency module all the time to continuously monitor the control channel, to receive a message transferred on the control channel. Specifically, referring to FIG. 1, FIG. 1 is a sequence chart showing that an access terminal monitors a control channel in a conventional technology. In FIG. 1, when being in a sleep state, the AT does not monitor the control channel, and therefore, does not receive a message transferred on the control channel. When the AT is in other states than the sleep state, the AT needs to continuously monitor the control channel, to receive a message transferred on the control channel. The AT is in other states than the sleep state most of the time. Consequently, continuous monitoring the control channel increases power consumption.

SUMMARY

This application provides a control channel monitoring method and an access terminal, to reduce system power consumption of an access terminal.

According to a first aspect, a control channel monitoring method is provided, including: detecting, by an access terminal if the access terminal is in an initialization state currently, whether the access terminal satisfies a first preset condition, where when satisfying the first preset condition in the initialization state, the access terminal does not need to receive an asynchronous capsule sent by an access network;
  detecting, by the access terminal if the access terminal is in a monitoring state currently, whether the access terminal satisfies a second preset condition, where when satisfying the second preset condition in the monitoring state, the access terminal does not need to receive the asynchronous capsule sent by the access network; and
  monitoring, by the access terminal, only a particular timeslot on a control channel if the access terminal satisfies the first preset condition in the initialization state or the access terminal satisfies the second preset condition in the monitoring state, where the particular timeslot is a timeslot that is used by the access network for sending a synchronous capsule or a sub-synchronous capsule.

By performing the method according to the first aspect, when an access terminal satisfies a first preset condition in an initialization state, or when an access terminal satisfies a second preset condition in a monitoring state, the access terminal monitors only a specified timeslot on a control channel, instead of continuously monitoring each timeslot on the control channel, thereby reducing system power consumption.

With reference to the first aspect, in a first implementation of the first aspect, the detecting, by an access terminal, whether the access terminal satisfies a first preset condition includes:
  determining, by the access terminal, whether the access terminal has received at least one synchronous capsule; and
  if the access terminal has received at least one synchronous capsule, determining, by the access terminal, whether the access terminal has not completely received a system message sent by the access network, where if the access terminal has not completely received the system message sent by the access network, a detection result is that the access terminal satisfies the first preset condition.

By performing the foregoing steps, when the access terminal in the initialization state has received the at least one synchronous capsule and has not completely received the system message sent by the access network, the access terminal may monitor only the specified timeslot on the control channel, thereby reducing system power consumption.

With reference to the first aspect, in a second implementation of the first aspect, if the access terminal needs to enter a suspension mode when a connection is disconnected, the detecting, by the access terminal, whether the access terminal satisfies a second preset condition includes:

determining, by the access terminal, whether a current moment is after a suspension mode end moment;
   determining, by the access terminal, whether the access terminal does not send data at the current moment and a data sending process before the current moment has ended; and
   determining, by the access terminal, whether the access terminal does not update a sector parameter at the current moment, where
   if all results of the foregoing determining are yes, a detection result is that the access terminal satisfies the second preset condition.

By performing the foregoing steps, after the suspension mode end moment, when the access terminal in the monitoring state has no data to send at the current moment, the data sending process before the current moment has ended, and the access terminal does not need to update the sector parameter at the current moment, the access terminal may monitor only the specified timeslot on the control channel, thereby reducing system power consumption.

With reference to the second implementation of the first aspect, in a third implementation of the first aspect, before the detecting, by the access terminal if the access terminal is in a monitoring state currently, whether the access terminal satisfies a second preset condition, the method further includes:

receiving, by the access terminal, a disconnection message sent by the access network, where the disconnection message carries suspension duration, and the suspension mode end moment is determined according to the suspension duration and a moment at which the access terminal receives the disconnection message.

With reference to the second implementation of the first aspect, in a fourth implementation of the first aspect, the determining, by the access terminal, whether the access terminal does not update a sector parameter at the current moment includes:

determining, by the access terminal according to indication information that indicates whether to update a sector parameter and that is carried in a latest synchronous capsule received by the access terminal, whether not to update the sector parameter, where
   if the latest synchronous capsule received by the access terminal carries indication information indicating that the sector parameter does not need to be updated, the access terminal does not update the sector parameter.

With reference to the first aspect or any implementation of the first aspect, in a fifth implementation of the first aspect, if the access terminal does not need to enter a suspension mode when a connection is disconnected, the detecting, by the access terminal, whether the access terminal satisfies a second preset condition includes:

determining, by the access terminal, whether the access terminal does not send data at a current moment and a data sending process before the current moment has ended; and
   determining, by the access terminal, whether the access terminal does not update a sector parameter at the current moment, where
   if both results of the foregoing determining are yes, a detection result is that the access terminal satisfies the second preset condition.

By performing the foregoing steps, when the access terminal in the monitoring state does not need to be disconnected with a delay when the connection is disconnected, and has no data to send at the current moment, the data sending process before the current moment has ended, and the access terminal does not need to update the sector parameter at the current moment, the access terminal may monitor only the specified timeslot on the control channel, thereby reducing system power consumption.

With reference to the first aspect or any implementation of the first aspect, in a sixth implementation of the first aspect, before the monitoring, by the access terminal, only a particular timeslot on a control channel, the method further includes:

calculating, by the access terminal according to a formula $T=\text{Offset}+4*N$, the timeslot that is used by the access network for sending the synchronous capsule or the sub-synchronous capsule, where T is the timeslot that is used by the access network for sending the synchronous capsule or the sub-synchronous capsule, Offset is an Offset field value carried in the first synchronous capsule that is sent by the access network to the access terminal, and a value range of the Offset is 0 to 3, and N is an integer greater than or equal to 0.

According to a second aspect, an access terminal is provided, where the access terminal includes a processor and a radio frequency module, and the processor is configured to perform the following operations:

detecting, by the processor if the access terminal is in an initialization state currently, whether the access terminal satisfies a first preset condition, where when satisfying the first preset condition in the initialization state, the access terminal does not need to receive an asynchronous capsule sent by an access network;
   detecting, by the processor if the access terminal is in a monitoring state currently, whether the access terminal satisfies a second preset condition, where when satisfying the second preset condition in the monitoring state, the access terminal does not need to receive the asynchronous capsule sent by the access network; and
   monitoring, by the processor by using the radio frequency module, only a particular timeslot on a control channel if the access terminal satisfies the first preset condition in the initialization state or the access terminal satisfies the second preset condition in the monitoring state, where the particular timeslot is a timeslot that is used by the access network for sending a synchronous capsule or a sub-synchronous capsule.

By performing the foregoing operations, when the access terminal satisfies a first preset condition in an initialization state, or when the access terminal satisfies a second preset condition in a monitoring state, the access terminal monitors only a specified timeslot on a control channel, instead of continuously monitoring each timeslot on the control channel, thereby reducing system power consumption.

With reference to the second aspect, in a first implementation of the second aspect, the detecting, by the processor, whether the access terminal satisfies a first preset condition includes:

determining, by the processor, whether the access terminal has received at least one synchronous capsule; and
   if the access terminal has received at least one synchronous capsule, determining, by the processor, whether the access terminal has not completely received a system message sent by the access network, where if the access terminal has not completely received the system message sent by the access network, a detection result is that the access terminal satisfies the first preset condition.

By performing the foregoing operations, when the access terminal in the initialization state has received the at least one synchronous capsule and has not completely received the system message sent by the access network, the access terminal may monitor only the specified timeslot on the control channel, thereby reducing system power consumption.

With reference to the second aspect, in a second implementation of the second aspect, if the access terminal needs to enter a suspension mode when a connection is disconnected, the detecting, by the processor, whether the access terminal satisfies a second preset condition includes:
  determining, by the processor, whether a current moment is after a suspension mode end moment;
  determining, by the processor, whether the access terminal does not send data at the current moment and a data sending process before the current moment has ended; and
  determining, by the processor, whether the access terminal does not update a sector parameter at the current moment, where
  if all results of the foregoing determining are yes, a detection result is that the access terminal satisfies the second preset condition.

By performing the foregoing operations, after the suspension mode end moment, when the access terminal in the monitoring state has no data to send at the current moment, and the data sending process before the current moment has ended, and the access terminal does not need to update the sector parameter at the current moment, the access terminal may monitor only the specified timeslot on the control channel, thereby reducing system power consumption.

With reference to the second implementation of the second aspect, in a third implementation of the second aspect, before the detecting, by the processor if the access terminal is in a monitoring state currently, whether the access terminal satisfies a second preset condition, the processor is further configured to perform the following operation:
  receiving, by the processor by using the radio frequency module, a disconnection message sent by the access network, where the disconnection message carries suspension duration, and the suspension mode end moment is determined according to the suspension duration and a moment at which the access terminal receives the disconnection message.

With reference to the second implementation of the second aspect, in a fourth implementation of the second aspect, the determining, by the processor, whether the access terminal does not update a sector parameter at the current moment includes:
  determining, by the processor according to indication information that indicates whether to update a sector parameter and that is carried in a latest synchronous capsule received by the access terminal, whether not to update the sector parameter, where
  if the latest synchronous capsule received by the access terminal carries indication information indicating that the sector parameter does not need to be updated, the access terminal does not update the sector parameter.

With reference to the second implementation of the second aspect, in a fifth implementation of the second aspect, if the access terminal does not need to enter a suspension mode when a connection is disconnected, the detecting, by the processor, whether the access terminal satisfies a second preset condition includes:
  determining, by the processor, whether the access terminal does not send data at a current moment and a data sending process before the current moment has ended; and
  determining, by the processor, whether the access terminal does not update a sector parameter at the current moment, where
  if both results of the foregoing determining are yes, a detection result is that the access terminal satisfies the second preset condition.

By performing the foregoing operations, when the access terminal in the monitoring state does not need to be disconnected with a delay when the connection is disconnected, and has no data to send at the current moment, the data sending process before the current moment has ended, and the access terminal does not need to update the sector parameter at the current moment, the access terminal may monitor only the specified timeslot on the control channel, thereby reducing system power consumption.

With reference to the second aspect or any implementation of the second aspect, in a sixth implementation of the second aspect, before the monitoring, by the processor by using the radio frequency module, only a particular timeslot on a control channel, the processor is further configured to perform the following operation:
  calculating, by the processor according to a formula $T=\text{Offset}+4*N$, the timeslot that is used by the access network for sending the synchronous capsule or the sub-synchronous capsule, where T is the timeslot that is used by the access network for sending the synchronous capsule or the sub-synchronous capsule, Offset is an Offset field value carried in the first synchronous capsule that is sent by the access network to the access terminal, and a value range of the Offset is 0 to 3, and N is an integer greater than or equal to 0.

According to a third aspect, an access terminal is provided, where the access terminal includes modules or units that are configured to perform the control channel monitoring method described in the first aspect or any implementation of the first aspect.

For example, the access terminal includes a first detection unit, a second detection unit, and a monitoring unit, where
  the first detection unit is configured to: if the access terminal is in an initialization state currently, detect whether the access terminal satisfies a first preset condition, where when satisfying the first preset condition in the initialization state, the access terminal does not need to receive an asynchronous capsule sent by an access network;
  the second detection unit is configured to: if the access terminal is in a monitoring state currently, detect whether the access terminal satisfies a second preset condition, where when satisfying the second preset condition in the monitoring state, the access terminal does not need to receive the asynchronous capsule sent by the access network; and
  the monitoring unit is configured to monitor only a particular timeslot on a control channel if the first detection unit detects that the access terminal satisfies the first preset condition in the initialization state or the second detection unit detects that the access terminal satisfies the second preset condition in the monitoring state, where the particular timeslot is a timeslot that is used by the access network for sending a synchronous capsule or a sub-synchronous capsule.

The modules or units included in the access terminal may be named in another manner besides the foregoing naming manner.

Theses aspects of this application are clearer and easier for understanding in descriptions of embodiments below.

BRIEF DESCRIPTION OF DRAWINGS

To describe the technical solutions in the embodiments of the present invention or in the conventional technology more clearly, the following briefly introduces the accompanying drawings required for describing the embodiments.

DESCRIPTION OF EMBODIMENTS

The following clearly describes the technical solutions in the embodiments of the present invention with reference to the accompanying drawings in the embodiments of the present invention.

Figure 2:
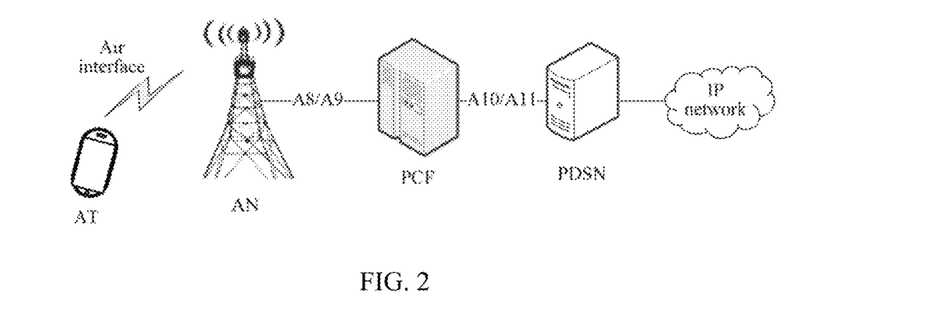
FIG. 2 is a schematic architectural diagram of a communications system to which embodiments of the present invention are applicable.

Referring to FIG. 2, FIG. 2 is a schematic architectural diagram of a communications system to which embodiments of the present invention are applicable. In FIG. 2, the communications system is a known high rate packet data (HRPD)/1× EV-DO code division multiple access (CDMA) system. The communications system includes an AT, an AN, a packet control function (PCF) unit, a packet data serving node (PDSN), and an Internet Protocol (IP) network.

The AT and the AN are connected by means of an air interface, and the air interface is an HRPD/1× EV-DO air interface. The AN includes a base station (BTS) and a base station controller (BSC), and is configured to provide a communications service for at least one AT. The AT includes a mobile phone, a tablet computer (carrying a SIM card), a personal digital assistant (PDA), or another wireless communications device. A user service between the AN and the PCF is transmitted by using an A8 interface. Signaling information between the AN and the PCF is transmitted by using an A9 interface. A user service between the PCF and the PDSN is transmitted by using an A10 interface. Signaling information between the PCF and the PDSN is transmitted by using an A11 interface. The PCF is a device that is in a wireless domain and that is configured to interface with a packet domain. Because the A8/A9 is not required to be open, the PCF may be a board card integrated in a BSC/mobile switching center (MSC), or may be a separate device. When the AT establishes a connection, the MSC determines whether the user requests a voice service or a data service, and if the user requests a data service, the MSC triggers the PCF and the PDSN to establish a connection. The PDSN is a key device in an HRPD network, and acts as a bridge for interfacing with a wireless network and an IP network.

Figure 3:
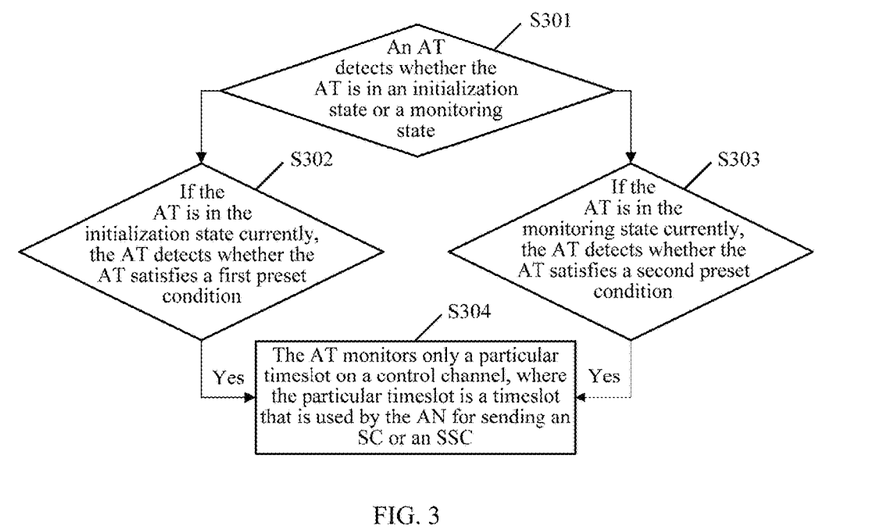
FIG. 3 is a schematic flowchart of a control channel monitoring method according to an embodiment of the present invention.

Referring to FIG. 3, FIG. 3 is a schematic flowchart of a control channel monitoring method according to an embodiment of the present invention. The control channel monitoring method is applied to a wireless access point side in a communications system. The method includes, but is not limited to, the following steps.

S301: An AT detects whether the AT is in an initialization state or a monitoring state, and if the AT is in the initialization state currently, performs step S302; if the AT is in the monitoring state currently, performs step S303.

S302: If the AT is in the initialization state currently, the AT detects whether the AT satisfies a first preset condition.

The AT may determine whether the AT is in the initialization state at a current moment, and if yes, detect whether the AT satisfies the first preset condition. When satisfying the first preset condition in the initialization state, the AT does not need to receive an asynchronous capsule sent by an AN.

Specifically, a manner in which the AT detects whether the AT satisfies the first preset condition is specifically:

determining, by the AT, whether the AT has received at least one SC; and if the AT has received at least one SC, determining, by the AT, whether the AT has not completely received a system message sent by the AN.

In this embodiment of the present invention, the system message is specifically a system message related to a resided cell, including a system synchronous message, a quick configuration message, and a sector parameter message. All these three messages are transferred on a control channel by using an SC or an SSC. The system synchronous message carries parameters such as a system time and a pseudo noise (PN) phase offset of a sector, and the AT performs time synchronization to the system according to the received system time. The quick configuration message carries parameters such as a sector ID, a color code, and an access identifier. The sector parameter message carries parameters such as a user location, a system time, a neighboring cell list, and a subnet mask.

Generally, multiple SCs and/or SSCs are needed to completely transfer the foregoing system message. Therefore, the AT needs to receive multiple SCs and/or SSCs sent by the AN, to completely collect the foregoing system message, perform time synchronization to the system, and perform cell selection and residence. A control channel header in a Media Access Control (MAC) layer packet in the first SC sent by the AN to the AT carries an Offset field value whose length is 2 bits and whose value range is 0 to 3. The parameter is set for each sector, and generally does not change once set. The AT learns a value of an Offset by reading the SC message. If the AT has received at least one synchronous capsule (that is, the AT has learned the value of the Offset), and has not completely received the foregoing system message sent by the AN, a detection result is that the AT satisfies the first preset condition.

S303: If the AT is in the monitoring state currently, the AT detects whether the AT satisfies a second preset condition.

The AT may determine whether the AT is in the monitoring state at the current moment, and if yes, detect whether the AT satisfies the second preset condition. When satisfying the second preset condition in the monitoring state, the AT does not need to receive an asynchronous capsule sent by the AN.

Specifically, switching of the AT from a connected state to the monitoring state is triggered by a disconnection message, and the disconnection message may be originally sent from the AT to the AN, or may be originally sent from the AN to the AT. The disconnection message may carry a disconnection reason, and the disconnection reason includes a normal disconnection, a delayed disconnection, or a connection error. The disconnection message may further carry a suspension start field value. If the value is 0, it indicates that the AT needs to enter a suspension mode, and if the value is 1, it indicates that the AT does not need to enter the suspension mode. If the AT needs to enter the suspension mode, the disconnection message may further carry suspension duration. For example, the suspension duration is 80 ms. The AT may determine, by parsing the disconnection message, whether the AT needs to enter the suspension mode.

If the AT needs to enter the suspension mode when a connection is disconnected, the detecting, by the AT, whether the AT satisfies a second preset condition includes:
    determining, by the AT, whether the current moment is after a suspension mode end moment;
    determining, by the AT, whether the AT does not send data at the current moment and a data sending process before the current moment has ended; and
    determining, by the AT, whether the AT does not update a sector parameter at the current moment, where
    if all results of the foregoing determining are yes, a detection result is that the AT satisfies the second preset condition.

Optionally, before the detecting, by the AT in the monitoring state, whether the AT satisfies a second preset condition, the method further includes:
    receiving, by the AT, the disconnection message sent by the AN, where the disconnection message carries the suspension duration, and the suspension mode end moment is determined according to the suspension duration and a moment at which the AT receives the disconnection message. For example, the suspension duration is 80 ms, the AT is in a monitoring mode within 80 ms after receiving the disconnection message sent by the AN, and the AT enters the monitoring state after 80 ms.

The AT determines, according to indication information that indicates whether to update a sector parameter and that is carried in a latest synchronous capsule received by the AT, whether not to update the sector parameter. Specifically, the quick configuration message carries a sector signature field. When the AT needs to update a sector parameter, the AN sets the sector signature field to a sector signature field for a next sector parameter message. If the AT determines that a value of the sector signature field in the received quick configuration message changes, the AT determines that the sector parameter needs to be updated. If the AT determines that the value of the sector signature field in the received quick configuration message does not change, the AT determines that the sector parameter does not need to be updated.

If the AT does not need to enter the suspension mode when a connection is disconnected, the detecting, by the AT, whether the AT satisfies a second preset condition includes:
    determining, by the AT, whether the AT does not send data at the current moment and a data sending process before the current moment has ended; and
    determining, by the AT, whether the AT does not update a sector parameter at the current moment, where
    if both results of the foregoing determining are yes, a detection result is that the AT satisfies the second preset condition.

S304: If the AT satisfies the first preset condition in the initialization state or the AT satisfies the second preset condition in the monitoring state, the AT monitors only a particular timeslot on a control channel, where the particular timeslot is a timeslot that is used by the AN for sending an SC or an SSC.

Optionally, before the monitoring, by the AT, only a particular timeslot on a control channel, the method further includes:
    calculating, by the AT according to a formula T=Offset+4*N, the timeslot that is used by the AN for sending an SC or an SSC.

T is the timeslot that is used by the AN for sending an SC or an SSC, Offset is a value that is obtained by the AT from a first SC sent by the AN, and N is an integer greater than or equal to 0. For example, if Offset is 2, T is a timeslot 2, a timeslot 6, a timeslot 10, a timeslot 14, . . . on the control channel. Messages carried in the SC or the SSC include a system synchronous message, a quick configuration message, a sector parameter message, an access parameter message, and a paging message.

Figure 4:
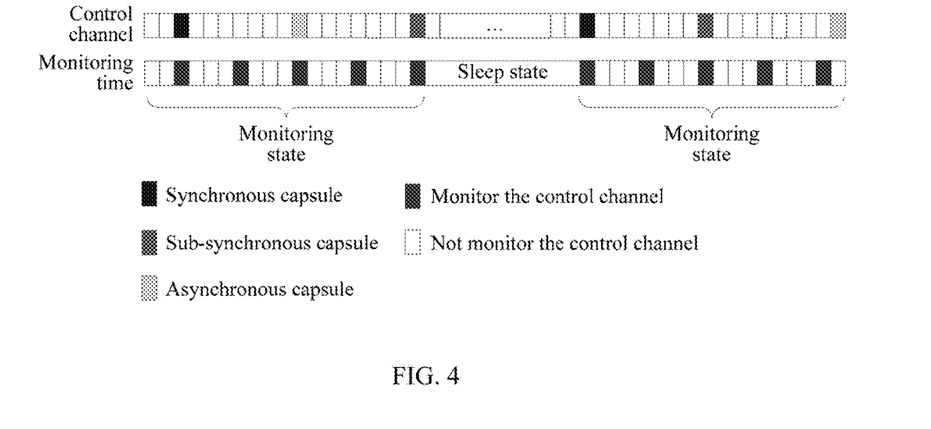
FIG. 4 is a sequence chart showing that an access terminal monitors a control channel according to an embodiment of the present invention.

Specifically, referring to FIG. 4, FIG. 4 is a sequence chart showing that an access terminal monitors a control channel according to an embodiment of the present invention. FIG. 4 is described by using an example in which the AT is in the monitoring state. In FIG. 4, when the AT satisfies the second preset condition in the monitoring state, the AT monitors only a specified timeslot, satisfying the formula T=Offset+4*N, on the control channel, instead of continuously monitoring each timeslot on the control channel. It can be seen that, when being in a sleep state, the AT does not monitor the control channel, and this is the same as that in the conventional technology. Similarly, when the AT satisfies the first preset condition in the initialization state, the AT also monitors only the specified timeslot, satisfying the formula T=Offset+4*N, on the control channel, instead of continuously monitoring each timeslot on the control channel. When the AT is in a connected state, when the AT is in a non-activated state, when the AT is in a connection establishment state, when the AT is in the initialization state and does not satisfy the first preset condition, or when the AT is in the monitoring state and does not satisfy the second preset condition, the AT still acts according to the conventional technology, that is, needs to continuously monitor the control channel and monitor each timeslot on the control channel, to receive a message transferred on the control channel.

It should be noted that, when the AT monitors only the specified timeslot, during time corresponding to other timeslots than the specified timeslot, the AT may close a radio frequency module (including a radio frequency front end (RFFE) and a radio frequency integrated circuit (RFIC)) (or may set the radio frequency module in a low-power-consumption state), and may further set a processor and another related communications hardware logical unit of the AT in a low-power-consumption state, to reduce system power consumption.

By performing the foregoing steps, when an access terminal satisfies a first preset condition in an initialization state, or when an access terminal satisfies a second preset condition in a monitoring state, the access terminal monitors only a specified timeslot on a control channel, instead of continuously monitoring each timeslot on the control channel, thereby reducing system power consumption.

To facilitate better implementation of the foregoing control channel monitoring method in the embodiments of the present invention, the present invention further provides an access terminal for implementing the foregoing method.

Figure 5:
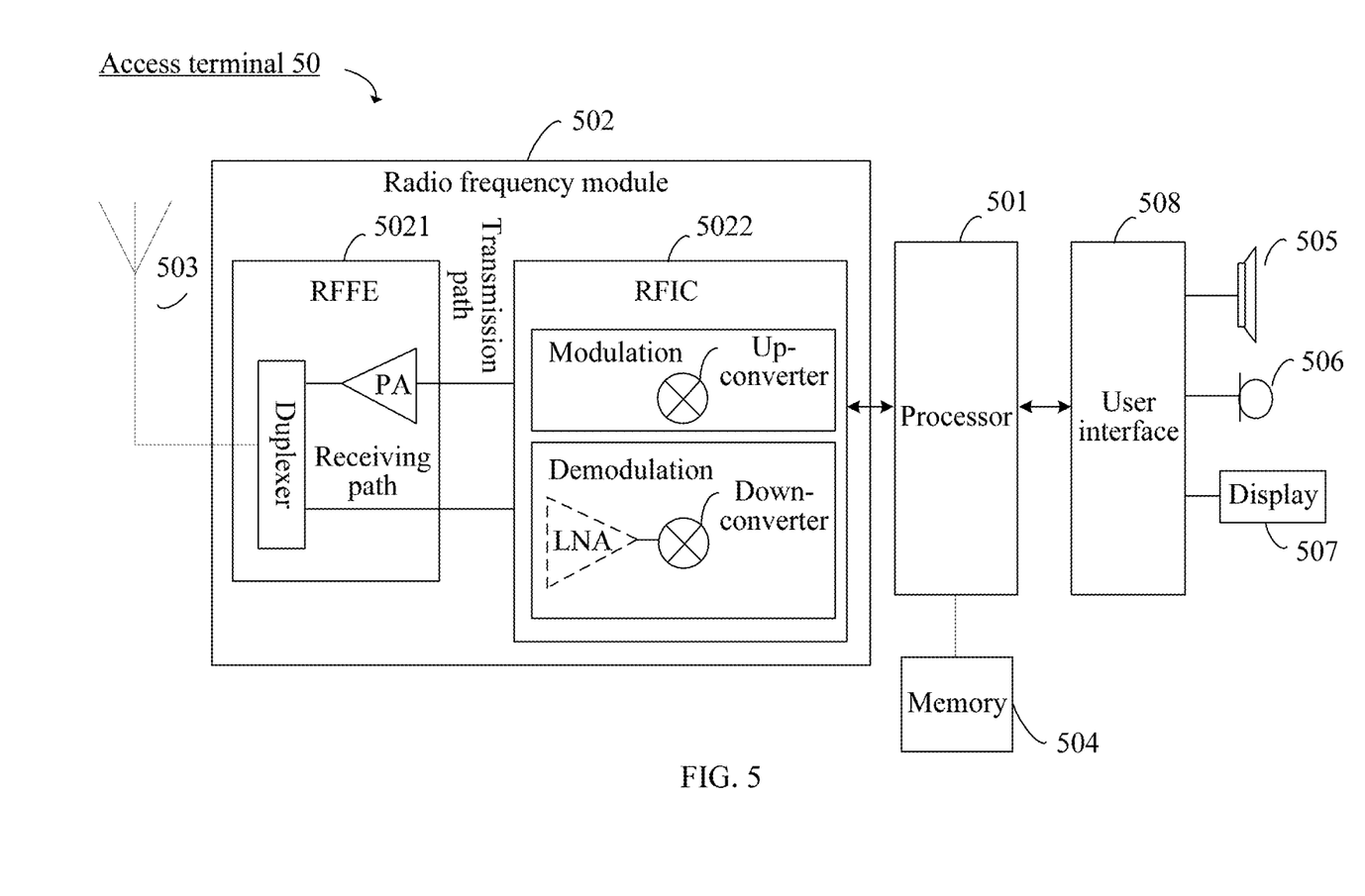
FIG. 5 is a schematic structural diagram of an access terminal according to an embodiment of the present invention.

Referring to FIG. 5, FIG. 5 is a schematic structural diagram of an access terminal according to an embodiment of the present invention. The access terminal 50 in this embodiment may include: at least one processor 501, a radio frequency module 502, an antenna 503, a memory 504, an input/output module (including an audio input/output module 505, a key input module 506, a display 507, and the like), and a user interface 508. In some embodiments of the present invention, these components can be connected by using a bus or in another manner. The radio frequency module 502 includes an RFFE 5021 and an RFIC 5022.

The processor 501 may be a general processor, for example, a central processing unit (CPU), or may be a digital signal processor (DSP), an application-specific integrated circuit (ASIC), or one or more integrated circuits configured to implement this embodiment of the present invention. The processor 501 may process data that is received by using the radio frequency module 502. The processor 501 may also process data that is to be sent to the radio frequency module 502 for transfer by using the antenna 503.

The radio frequency module 502 modulates the to-be-sent data that is from processor 501 and then transmits modulated data by using the antenna 503 (a transmission path), or demodulates an air-interface signal received by the antenna 503 and then sends demodulated data to the processor 501 for processing according to a communications protocol (a receiving path).

The RFFE 5021 includes a duplexer and a power amplifier (PA). The duplexer is used for coupling both the transmission path and the receiving path into the antenna 503, so that the antenna 503 may perform transmission or receiving or both transmission and receiving. The PA is mainly configured to perform, on the transmission path, power amplification on a to-be-sent signal, so that the to-be-sent signal may be transmitted from the antenna 503.

The RFIC is a modem unit, is configured to convert, on the transmission path, a low frequency signal into a high frequency RF signal (that is, up-conversion. This function is implemented by an up-converter in FIG. 5), and is further configured to demodulate a high frequency RF signal to a baseband signal (that is, down-conversion. This function is implemented by a down-converter in FIG. 5). An up/down converter is a mixer, and generates a baseband signal by mixing a high frequency RF signal with a local oscillator, or generates a high frequency RF signal by mixing a baseband signal with a local oscillator.

On the receiving path, before demodulation, a low noise amplifier (LNA) may further be included and is configured to amplify a received signal.

The bus may be an industry standard architecture (ISA) bus, a peripheral component interconnect PCI) bus, an extended industry standard architecture (EISA) bus, or the like. The bus may be classified as an address bus, a data bus, a control bus, or the like.

The memory 504 is configured to store program code, and transmit the program code to the CPU. The memory 504 may include a volatile memory, for example, a random access memory (RAM). Alternatively, the memory may include a non-volatile memory, for example, a read-only memory (ROM), a flash memory, a hard disk drive (HDD), or a solid-state drive (SSD). Alternatively, the memory 504 may include a combination of the foregoing types of memories. The memory 504 is connected to the processor 501 by using the bus.

The input/output module is mainly configured to implement a function of interaction between the access terminal 50 and a user or an external environment, and mainly includes the audio input/output module 505, the key input module 506, the display 507, and the like. In specific implementation, the input/output module may further include a camera, a touchscreen, a sensor, and the like. All the input/output modules communicate with the processor 501 by means of the user interface 508.

The processor 501 is configured to invoke program code for control channel monitoring stored in the memory 504, to perform the following operations:

detecting, by the processor 501 if the access terminal 50 is in an initialization state currently, whether the access terminal 50 satisfies a first preset condition, where when satisfying the first preset condition in the initialization state, the access terminal 50 does not need to receive an asynchronous capsule sent by an access network;

detecting, by the processor 501 if the access terminal 50 is in a monitoring state currently, whether the access terminal 50 satisfies a second preset condition, where when satisfying the second preset condition in the monitoring state, the access terminal 50 does not need to receive the asynchronous capsule sent by the access network; and monitoring, by the processor 501 by using the radio frequency module 502, only a particular timeslot on a control channel if the access terminal 50 satisfies the first preset condition in the initialization state or the access terminal 50 satisfies the second preset condition in the monitoring state, where the particular timeslot is a timeslot that is used by the access network for sending a synchronous capsule or a sub-synchronous capsule.

By performing the foregoing steps, when the access terminal 50 satisfies a first preset condition in an initialization state, or when the access terminal 50 satisfies a second preset condition in a monitoring state, the access terminal 50 monitors only a specified timeslot on a control channel, instead of continuously monitoring each timeslot on the control channel, thereby reducing system power consumption.

Optionally, the detecting, by the processor 501, whether the access terminal 50 satisfies a first preset condition includes:

determining, by the processor 501, whether the access terminal 50 has received at least one synchronous capsule; and if the access terminal 50 has received at least one synchronous capsule, determining, by the processor 501, whether the access terminal 50 has not completely received a system message sent by the access network, where if the access terminal 50 has not completely received the system message sent by the access network, a detection result is that the access terminal 50 satisfies the first preset condition.

By performing the foregoing steps, when the access terminal 50 in the initialization state has received the at least one synchronous capsule and has not completely received the system message sent by the access network, the access terminal 50 may monitor only the specified timeslot on the control channel, thereby reducing system power consumption.

Optionally, if the access terminal needs to enter a suspension mode when a connection is disconnected, the detecting, by the processor 501, whether the access terminal 50 satisfies a second preset condition includes:

determining, by the processor 501, whether a current moment is after a suspension mode end moment;

determining, by the processor 501, whether the access terminal 50 does not send data at the current moment and a data sending process before the current moment has ended; and     determining, by the processor 501, whether the access terminal 50 does not update a sector parameter at the current moment, where         if all results of the foregoing determining are yes, a detection result is that the access terminal 50 satisfies the second preset condition.

By performing the foregoing steps, after the suspension mode end moment, when the access terminal 50 in the monitoring state has no data to send at the current moment, the data sending process before the current moment has ended, and the access terminal 50 does not need to update the sector parameter at the current moment, the access terminal 50 may monitor only the specified timeslot on the control channel, thereby reducing system power consumption.

Optionally, before the detecting, by the processor 501 if the access terminal 50 is in a monitoring state currently, whether the access terminal 50 satisfies a second preset condition, the processor 501 is further configured to perform:

receiving, by the processor 501 by using the radio frequency module 502, a disconnection message sent by the access network, where the disconnection message carries suspension duration, and the suspension mode end moment is determined according to the suspension duration and a moment at which the access terminal 50 receives the disconnection message.

Optionally, the determining, by the processor 501, whether the access terminal 50 does not update a sector parameter at the current moment includes:

determining, by the processor 501 according to indication information that indicates whether to update a sector parameter and that is carried in a latest synchronous capsule received by the access terminal 50, whether not to update the sector parameter.

Optionally, if the access terminal 50 does not need to enter a suspension mode when a connection is disconnected, the detecting, by the processor 501, whether the access terminal 50 satisfies a second preset condition includes:

determining, by the processor 501, whether the access terminal 50 does not send data at a current moment and a data sending process before the current moment has ended; and     determining, by the processor 501, whether the access terminal 50 does not update a sector parameter at the current moment, where         if both results of the foregoing determining are yes, a detection result is that the access terminal 50 satisfies the second preset condition.

By performing the foregoing steps, when the access terminal 50 in the monitoring state does not need to be disconnected with a delay when the connection is disconnected, and has no data to send at the current moment, the data sending process before the current moment has ended, and the access terminal 50 does not need to update the sector parameter at the current moment, the access terminal 50 may monitor only the specified timeslot on the control channel, thereby reducing system power consumption.

Optionally, before the monitoring, by the processor 501 by using the radio frequency module 502, only a particular timeslot on a control channel, the processor 501 is further configured to perform the following operation:

calculating, by the processor 501 according to a formula $T=\text{Offset}+4*N$, the timeslot that is used by the access network for sending the synchronous capsule or the sub-synchronous capsule, where T is the timeslot that is used by the access network for sending the synchronous capsule or the sub-synchronous capsule, Offset is an Offset field value carried in the first synchronous capsule that is sent by the access network to the access terminal, and a value range of the Offset is 0 to 3, and N is an integer greater than or equal to 0.

It should be noted that, when the access terminal 50 monitors only the specified timeslot, during time corresponding to other timeslots than the specified timeslot, the access terminal 50 may close the radio frequency module 502 (including the RFFE 5021 and the RFIC 5022) (or may set the radio frequency module 502 in a low-power-consumption state), and may further set the processor 501 and another related communications hardware logical unit of the access terminal 50 in a low-power-consumption state, to reduce system power consumption.

It should be noted that, functions of the functional modules in the access terminal 50 described in this embodiment of the present invention may be specifically implemented according to the foregoing method in the method embodiment shown in FIG. 3, and details are not described herein again.

Figure 6:
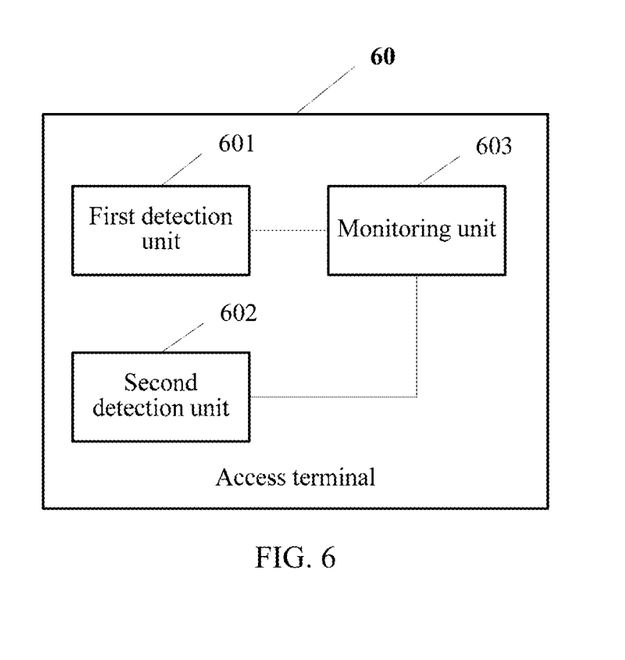
FIG. 6 is a schematic structural diagram of another access terminal according to an embodiment of the present invention.

Referring to FIG. 6, FIG. 6 is a schematic structural diagram of another access terminal according to an embodiment of the present invention. As shown in FIG. 6, the access terminal 60 may include a first detection unit 601, a second detection unit 602, and a monitoring unit 603.

The first detection unit 601 is configured to: if the access terminal 60 is in an initialization state currently, detect whether the access terminal 60 satisfies a first preset condition, where when satisfying the first preset condition in the initialization state, the access terminal 60 does not need to receive an asynchronous capsule sent by an access network.

The second detection unit 602 is configured to: if the access terminal 60 is in a monitoring state currently, detect whether the access terminal 60 satisfies a second preset condition, where when satisfying the second preset condition in the monitoring state, the access terminal 60 does not need to receive the asynchronous capsule sent by the access network.

The monitoring unit 603 is configured to monitor only a particular timeslot on a control channel if the first detection unit 601 detects that the access terminal 60 satisfies the first preset condition in the initialization state or the second detection unit 602 detects that the access terminal 60 satisfies the second preset condition in the monitoring state, where the particular timeslot is a timeslot that is used by the access network for sending a synchronous capsule or a sub-synchronous capsule.

In this embodiment, the access terminal 60 is presented in the form of functional units. The "unit" herein may refer to an ASIC circuit, a processor executing one or more software or firmware programs and a memory storing the same, and/or another component that can provide the foregoing functions. The access terminal 60 may be in the form shown in FIG. 5. For example, the first detection unit 601 and the second detection unit 602 may be implemented by using the processor 501 in FIG. 5, and the monitoring unit 603 may be implemented by using the radio frequency module 502 and the antenna 503 in FIG. 5.

By running the foregoing units, when the access terminal 60 satisfies a first preset condition in an initialization state, or when the access terminal 60 satisfies a second preset condition in a monitoring state, the access terminal 60 monitors only a specified timeslot on a control channel, instead of continuously monitoring each timeslot on the control channel, thereby reducing system power consumption.

Optionally, the first detection unit 601 includes:
a first determining unit 6011, configured to determine whether the access terminal 60 has received at least one synchronous capsule; and
a second determining unit 6012, configured to: if the first determining unit 6011 determines that the access terminal 60 has received at least one synchronous capsule, determine whether the access terminal 60 has not completely received a system message sent by the access network, where if it is determined that the access terminal 60 has not completely received the system message sent by the access network, a detection result is that the access terminal 60 satisfies the first preset condition.

Optionally, if the access terminal needs to enter a suspension mode when a connection is disconnected, the second detection unit 602 includes:
a third determining unit 6021, configured to determine whether a current moment is after a suspension mode end moment;
a fourth determining unit 6022, configured to determine whether the access terminal 60 does not send data at the current moment and a data sending process before the current moment has ended; and
a fifth determining unit 6023, configured to determine whether the access terminal 60 does not update a sector parameter at the current moment, where
if all determining results of the third determining unit 6021, the fourth determining unit 6022, and the fifth determining unit 6023 are yes, a detection result is that the access terminal 60 satisfies the second preset condition.

Optionally, if the access terminal 60 does not need to enter a suspension mode when a connection is disconnected, the second detection unit 602 includes:
a fourth determining unit 6022, configured to determine whether the access terminal does not send data at a current moment and a data sending process before the current moment has ended; and
a fifth determining unit 6023, configured to determine whether the access terminal does not update a sector parameter at the current moment, where
if both determining results of the fourth determining unit 6022 and the fifth determining unit 6023 are yes, a detection result is that the access terminal satisfies the second preset condition.

Optionally, the access terminal 60 further includes:
a calculation unit 604, configured to calculate, according to a formula $T=Offset+4*N$, the timeslot that is used by the access network for sending the synchronous capsule or the sub-synchronous capsule, where T is the timeslot that is used by the access network for sending the synchronous capsule or the sub-synchronous capsule, Offset is an Offset field value carried in the first synchronous capsule that is sent by the access network to the access terminal, and a value range of the Offset is 0 to 3, and N is an integer greater than or equal to 0.

It should be noted that, functions of the functional units in the access terminal 60 described in the foregoing embodiment may be specifically implemented according to the foregoing method in the method embodiment shown in FIG. 3, and details are not described herein again.

To sum up, by implementing the embodiments of the present invention, when an access terminal satisfies a first preset condition in an initialization state, or when the access terminal satisfies a second preset condition in a monitoring state, the access terminal monitors only a specified timeslot on a control channel, instead of continuously monitoring each timeslot on the control channel, thereby reducing system power consumption.

A person of ordinary skill in the art may understand that all or some of the processes of the methods in the embodiments may be implemented by a computer program instructing relevant hardware. The program may be stored in a computer readable storage medium. When the program runs on a radio access point, the processes of the methods in the embodiments are performed. The storage medium may be a magnetic disk, an optical disk, a ROM or RAM, or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A control channel monitoring method performed by an access terminal, comprising:
operating in a first capsule receiving mode wherein the access terminal is configured to receive an asynchronous capsule sent by an access network on a control channel;
detecting, by the access terminal while operating in the first capsule receiving mode, a condition for terminating the first capsule receiving mode, wherein the detecting comprises:
when the access terminal is currently in an initialization state, determining the access terminal satisfies a first preset terminating condition, and
when the access terminal is currently in a monitoring state, determining the access terminal satisfies a second preset terminating condition that differs from the first preset terminating condition; and
operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
wherein the second preset terminating condition at a current moment comprises, in combination:
the current moment is after a suspension mode end moment;
the access terminal does not send data at the current moment;
a data sending process, which was operating before the current moment, has ended; and
the access terminal does not update a sector parameter at the current moment.

2. The method according to claim 1, wherein the first preset terminating condition-comprises the access terminal:
has received a synchronous capsule; and has not completely received a system message sent in part by the access network in the synchronous capsule.

3. The method according to claim 1, wherein the second preset terminating condition in the current moment further comprises:
the access terminal receiving a disconnection message sent by the access network,
wherein the disconnection message carries a suspension duration value, and the suspension mode end moment is determined according to the suspension duration and a moment at which the access terminal receives the disconnection message.

4. A control channel monitoring method performed by an access terminal, comprising:
operating in a first capsule receiving mode wherein the access terminal is configured to receive an asynchronous capsule sent by an access network on a control channel;
detecting, by the access terminal while operating in the first capsule receiving mode, a condition for terminating the first capsule receiving mode, wherein the detecting comprises:
when the access terminal is currently in an initialization state, determining the access terminal satisfies a first preset terminating condition, and
when the access terminal is currently in a monitoring state, determining the access terminal satisfies a second preset terminating condition that differs from the first preset terminating condition; and
operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
wherein when the access terminal does not need to enter a suspension mode when a connection is disconnected, the second preset terminating condition comprises in combination:
the access terminal does not send data at a current moment,
a data sending process, which was operating before the current moment, has ended; and
the access terminal does not update a sector parameter at the current moment.

5. A control channel monitoring method performed by an access terminal, comprising:
operating in a first capsule receiving mode wherein the access terminal is configured to receive an asynchronous capsule sent by an access network on a control channel;
detecting, by the access terminal while operating in the first capsule receiving mode, a condition for terminating the first capsule receiving mode, wherein the detecting comprises:
when the access terminal is currently in an initialization state, determining the access terminal satisfies a first preset terminating condition, and
when the access terminal is currently in a monitoring state, determining the access terminal satisfies a second preset terminating condition that differs from the first preset terminating condition; and
operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
wherein before the monitoring, by the access terminal, only the one particular timeslot on the control channel, the method further comprises:
obtaining, by the access terminal according to a formula $T=Offset+4*N$, the particular timeslot, on the control channel, that is used by the access network for sending the synchronous capsule or the sub-synchronous capsule,
wherein T is the particular timeslot used by the access network for sending the synchronous capsule or the sub-synchronous capsule,
wherein Offset is an Offset field value carried in the first synchronous capsule that is sent by the access network to the access terminal, and
wherein a value range of the Offset is 0 to 3, and N is an integer greater than or equal to 0.

6. An access terminal, comprising:
a processor; and
a non-transitory computer-readable memory storing computer-executable instructions which, when executed by the processor, facilitates the access terminal performing a method comprising the following operations:
operating in a first capsule receiving mode wherein the access terminal is configured to receive an asynchronous capsule sent by an access network on a control channel;
detecting, by the access terminal while operating in the first capsule receiving mode, a condition for terminating the first capsule receiving mode, wherein the detecting comprises:
when the access terminal is currently in an initialization state, determining the access terminal satisfies a first preset terminating condition, and
when the access terminal is currently in a monitoring state, determining the access terminal satisfies a second preset terminating condition that differs from the first preset terminating condition; and
operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
wherein the second preset terminating condition at a current moment comprises, in combination:
the current moment is after a suspension mode end moment;
the access terminal does not send data at the current moment;
a data sending process, which was operating before the current moment, has ended; and
the access terminal does not update a sector parameter at the current moment.

7. The access terminal according to claim 6, wherein the first preset terminating condition comprises the access terminal:
has received a synchronous capsule; and
has not completely received a system message sent in part by the access network in the synchronous capsule.

8. The access terminal according to claim 6, wherein the second preset terminating condition in the current moment further comprises:

the access terminal receiving a disconnection message sent by the access network,
wherein the disconnection message carries a suspension duration value, and the suspension mode end moment is determined according to the suspension duration and a moment at which the access terminal receives the disconnection message.

9. An access terminal, comprising:
a processor; and
a non-transitory computer-readable memory storing computer-executable instructions which, when executed by the processor, facilitates the access terminal performing a method comprising the following operations:
   operating in a first capsule receiving mode wherein the access terminal is configured to receive an asynchronous capsule sent by an access network on a control channel;
   detecting, by the access terminal while operating in the first capsule receiving mode, a condition for terminating the first capsule receiving mode, wherein the detecting comprises:
      when the access terminal is currently in an initialization state, determining the access terminal satisfies a first preset terminating condition, and
      when the access terminal is currently in a monitoring state, determining the access terminal satisfies a second preset terminating condition that differs from the first preset terminating condition; and
   operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
   wherein when the access terminal does not need to enter a suspension mode when a connection is disconnected, the second preset terminating condition comprises in combination:
      the access terminal does not send data at a current moment,
      a data sending process, which was operating before the current moment, has ended;
      the access terminal does not update a sector parameter at the current moment.

10. An access terminal, comprising:
a processor; and
a non-transitory computer-readable memory storing computer-executable instructions which, when executed by the processor, facilitates the access terminal performing a method comprising the following operations:
   operating in a first capsule receiving mode wherein the access terminal is configured to receive an asynchronous capsule sent by an access network on a control channel;
   detecting, by the access terminal while operating in the first capsule receiving mode, a condition for terminating the first capsule receiving mode, wherein the detecting comprises:
      when the access terminal is currently in an initialization state, determining the access terminal satisfies a first preset terminating condition, and
      when the access terminal is currently in a monitoring state, determining the access terminal satisfies a second preset terminating condition that differs from the first preset terminating condition; and
   operating in a second capsule receiving mode in response to the detecting the condition, wherein the operating in the second capsule receiving mode comprises monitoring, by the access terminal, only a particular timeslot on the control channel, wherein the particular timeslot is a timeslot used by the access network for sending a synchronous capsule or a sub-synchronous capsule,
   wherein before the monitoring, only the particular timeslot on the control channel, the method further comprises the following:
      obtaining, according to a formula $T=\text{Offset}+4*N$, the particular timeslot, on the control channel, that is used by the access network for sending the synchronous capsule or the sub-synchronous capsule,
      wherein T is the particular timeslot that is used by the access network for sending the synchronous capsule or the sub-synchronous capsule,
      wherein Offset is an Offset field value carried in the first synchronous capsule that is sent by the access network to the access terminal, and
      wherein a value range of the Offset is 0 to 3, and N is an integer greater than or equal to 0.

* * * * *